(12) United States Patent
Yoshioka et al.

(10) Patent No.: US 7,823,877 B2
(45) Date of Patent: Nov. 2, 2010

(54) TRANSPORTATION DEVICE AND IMAGE PROCESSING APPARATUS

(75) Inventors: Ichiro Yoshioka, Matsumoto (JP);
Hiroto Miyauchi, Matsumoto (JP);
Manabu Kawahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 12/328,491

(22) Filed: Dec. 4, 2008

(65) Prior Publication Data
US 2009/0146362 A1    Jun. 11, 2009

(30) Foreign Application Priority Data
Dec. 5, 2007    (JP)    ............... 2007-314233

(51) Int. Cl.
*B65H 1/00* (2006.01)
(52) U.S. Cl. ..................................... 271/162
(58) Field of Classification Search ............... 271/9.01, 271/9.11, 9.13, 162; D18/40, 46, 56
See application file for complete search history.

(56) References Cited

U.S. PATENT DOCUMENTS 6,612,561 B2 *   9/2003   Sekine ................. 271/3.14

2004/0188913 A1   9/2004   Kobayashi
2007/0201100 A1   8/2007   Ikeno et al.

FOREIGN PATENT DOCUMENTS

JP    05-014593    1/1993

* cited by examiner

*Primary Examiner*—David H Bollinger
(74) *Attorney, Agent, or Firm*—Workman Nydegger

(57) ABSTRACT

A transportation device including first and second tray portions which are stacked relative to each other, first and second transportation openings included in the first and second tray portions, respectively, and a transportation path for a material which is formed between the first and second transportation openings. The first tray portion includes a first movable tray portion which can be displaced, the second tray portion includes a second movable tray portion which can be displaced. The first movable tray portion and the second movable tray portion are configured move between a tray position where the first and second movable tray portions form a tray member for transporting the material and a housing position where the tray portions form a housing configuring member by closing the first and second transportation openings which are exposed in the tray position.

11 Claims, 8 Drawing Sheets

TRANSPORTATION DEVICE AND IMAGE PROCESSING APPARATUS

The entire disclosures of Japanese Patent Application No. 2007-314233, filed Dec. 5, 2007 is expressly incorporated herein by reference.

BACKGROUND OF THE INVENTION

1. Technical Field

The present invention relates to a transportation device for an image processing apparatus. More specifically, the present invention relates to a transportation device including a first and second tray.

2. Related Art

One example of a transportation device currently known in the art is a facsimile machine disclosed in Japanese Patent No. JP-A-5-14593. In this transportation device, a feed tray portion transporting a medium into a housing and an ejection tray portion for receiving the material ejected from the housing, are arranged in a vertically stack. More specifically, the inlet opening of the feed tray portion and the outlet opening of the ejection tray portion are disposed at different heights in the vertical position, but are formed at the same position in a transportation direction.

The transportation device has a slide portion where the feed tray portion slides into a housing. The feed tray portion is configured such that when the slide portion is pulled from the inlet opening the image processing apparatus is in an operational state and the material can be transported into the image processing apparatus. By contrast, the image processing apparatus is in an unused state when the slide portion is stored in the housing. When the image processing apparatus is in the operational state, the ejection tray portion is not structurally changed, but the length of the feed tray portion is increased by the length of the slide portion pulled from the inlet opening.

The transportation device also has a single cover member which is rotatably mounted on the front of the slide portion for closing the opening. The cover member is brought into contact with the inlet opening and the outlet opening when the slide portion is pushed into the housing so as to simultaneously close both the inlet opening and the outlet opening. When both openings are closed, the printer is in the unused state and foreign matter can be prevented from entering the image processing apparatus via the openings. Meanwhile, when the slide portion is pulled from the housing, the cover member rotates to an opened state, and the feed tray portion moves to the operational state.

When a user uses the transportation device, the user first pulls the slide portion from the housing, which opens both the inlet and outlet openings. Then, the cover member is opened, so the device is shifted to the operational state. Then the material to be transported is set in the feed tray portion with the increased length due to the additional length created by pulling out the slide portion. Then the material is transported into the housing by driving a transportation unit (transportation roller). As the material is transported on the transportation path in the housing, the material is subjected to an imaging process, flipped over, and ejected to the ejection tray portion positioned on the upper layer of the transportation unit.

In the transportation device described in JP-A-5-14593, the unit switches between the operational and unused state using the slide structure of the feed tray portion and the cover member which is provided on the front end of the slide portion. One problem with this sliding structure, however, is that the structure of the device is greatly changed due to the movement of the slide portion, and the center of gravity of the transportation device is moved due the increased length of the slide portion. Accordingly, the structural design necessary to keep the device stable becomes complicated.

The slide portion functions as a placement surface for the material when the slide portion is pulled out from the housing, but is stored inside the housing when the slide portion is thrust into the housing, making it an unnecessary component when the device is not being used. That is, in the slide structure, waste occurs in the space allotment for each of the components. The waste leads to the unnecessary increase in the amount of material used in each of the components and an unnecessary increase in the total weight of the device.

In addition, the transportation device described in JP-A-5-14593, it is necessary for a user to push and pull the slide portion in order to change the device from the unused state in which both the inlet opening and the outlet opening are closed by the cover member to the usable state in which the both openings are opened. Thus, operability of the device deteriorates.

BRIEF SUMMARY OF THE INVENTION

An advantage of some aspects of the invention is that it provides a transportation device including a first tray portion and a second tray portion which are capable of solving at least some of the problems of the prior art.

More specifically, aspects of the invention provide a transportation device capable of performing one action when an unused state and shifting to a operational state which has excellent operability, simplicity, and reliability.

One aspect of the invention is a transportation device comprising first and second tray portions which are stacked relative to each other, a first transportation opening included in the first tray portion, a second transportation opening included in the second tray portion, and a transportation path for a material to be transported through the transportation device, the transportation path being formed between the first transportation opening and the second transportation opening. The first tray portion includes a first movable tray portion which can be displaced and the second tray portion includes a second movable tray portion which can be displaced, and the first movable tray portion and the second movable tray portion are configured to transform between a tray position where the first and second movable tray portions comprise a tray member which is capable of transporting the material and a housing position where the first and second movable tray portions comprise a housing configuring member by closing the first and second transportation openings which are exposed in the tray position.

According to this configuration, the first movable tray portion and the second movable tray portion are configured to move from the tray position for transporting the material to the housing position by closing the first transportation opening and the second transportation opening. Accordingly, both openings can be opened when the apparatus is operating and closed when the apparatus is not being used so as to prevent foreign matter from being introduced, without complicating the structure of the apparatus. The first movable tray portion and the second movable tray portion function as a tray when the apparatus is operating and form a housing by closing the opening when the device not being used. Accordingly, waste does not occur in the allotment of the roles of the components.

Another aspect of the invention is an image processing apparatus including the transportation device described above and an image process executing unit which is provided in the transportation path which is capable of executing an image process on the material being transported.

As with the transportation device, the image processing apparatus of the claimed invention has a superior design and improved operability.

BRIEF DESCRIPTION OF THE DRAWINGS

The invention will be described with reference to the accompanying drawings, wherein like numbers reference like elements. In the drawings.

DESCRIPTION OF EXEMPLARY EMBODIMENTS

Hereinafter, a transportation device and an image processing apparatus capable of performing aspects of the invention will be described.

As may be understood by one of ordinary skill in the art, the transportation device described herein may be used in a variety of image processing devices, including an image reading device, such as a scanner which is capable of reading image information recorded on an original, a line printer or a serial printer, which is capable of recording an image, and various types of devices for performing predetermined image processes with respect to a material, such as multifunction printers which also function as a facsimile machine and copier.

Figure 1:
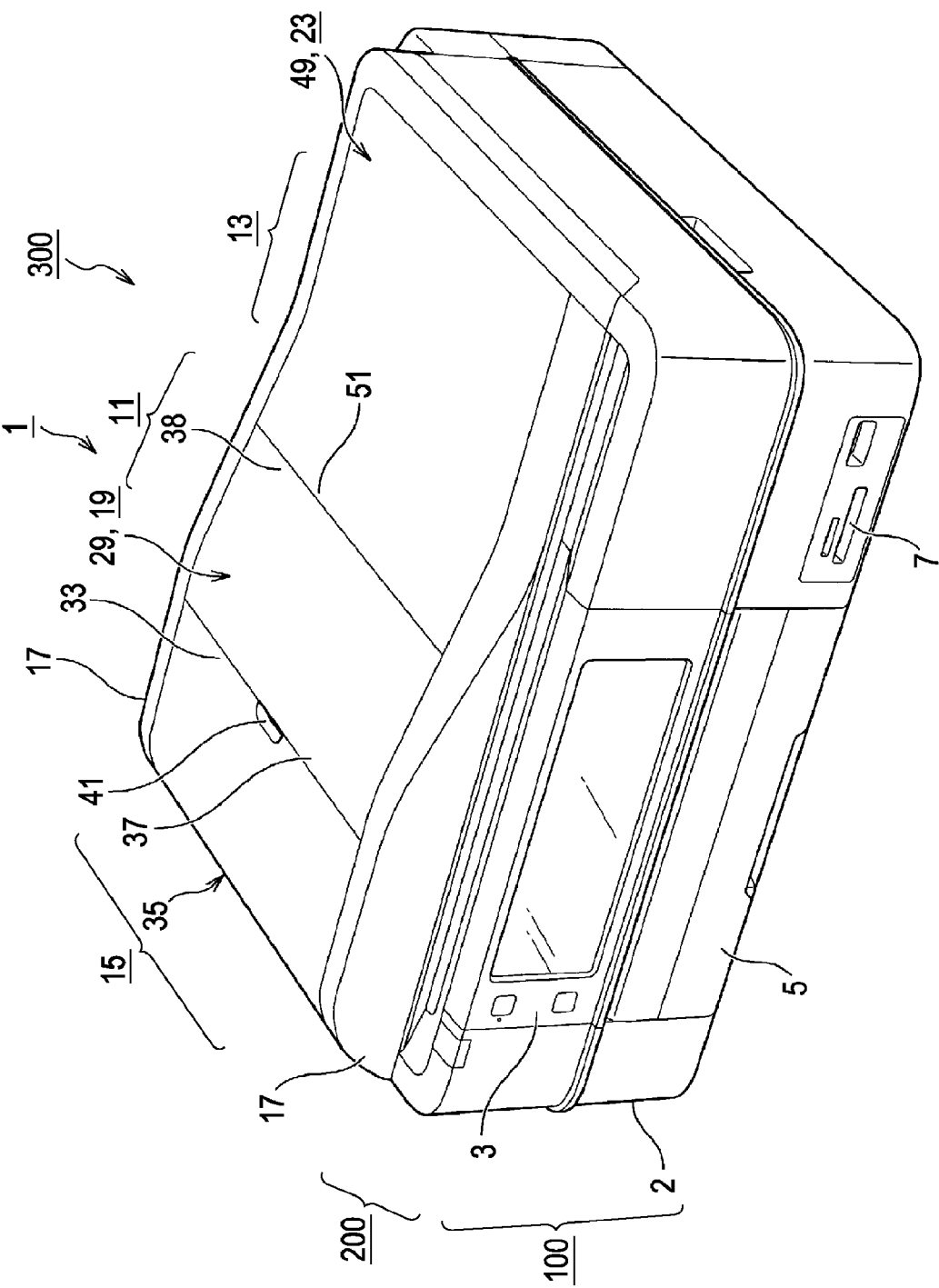
FIG. 1 is a perspective view showing the appearance of a multifunction printer as an image processing apparatus in an unused state.
Figure 2:
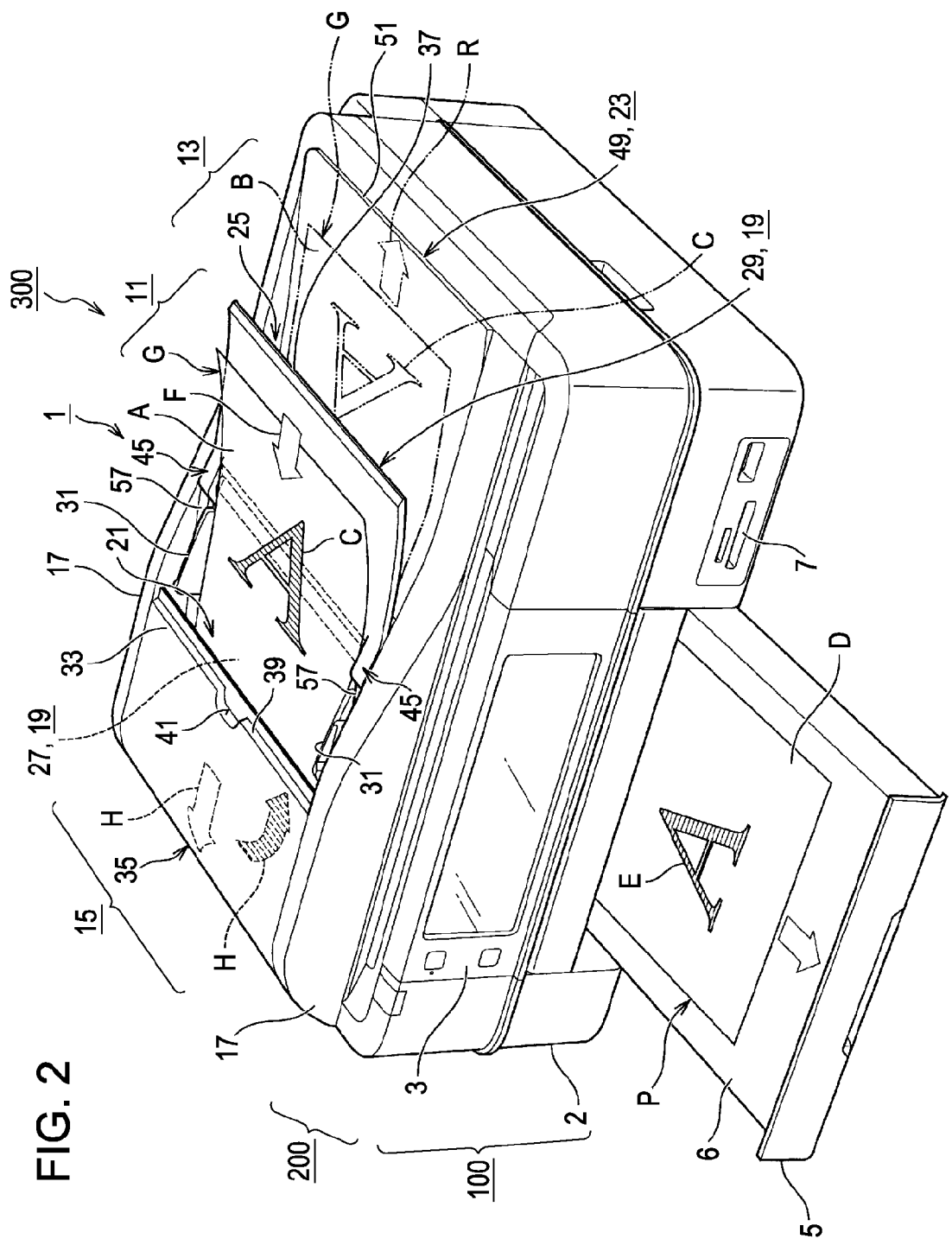
FIG. 2 is a perspective view showing the appearance of the multifunction printer in an operational state.
Figure 3:
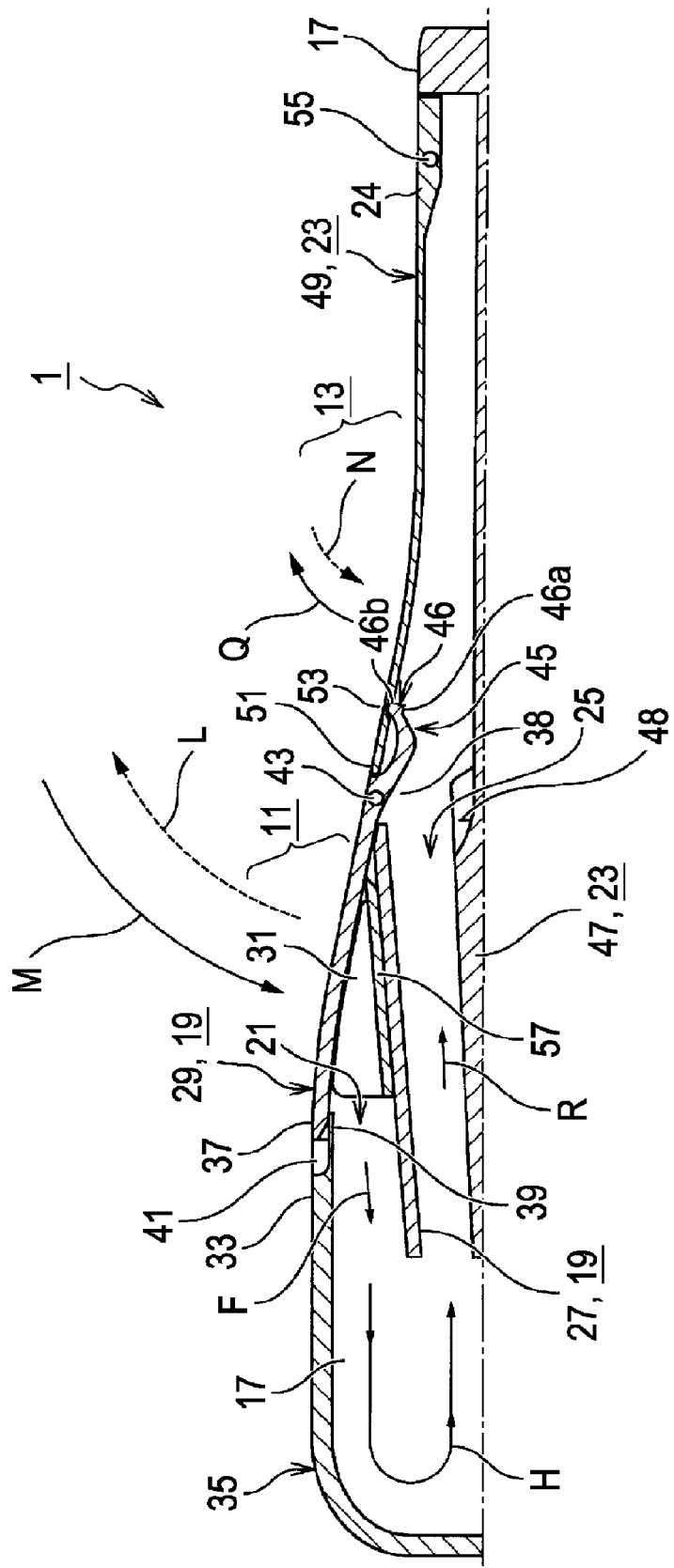
FIG. 3 is a side cross-sectional view showing a transportation device in which a first movable tray portion and a second movable tray portion are in a housing position.
Figure 4:
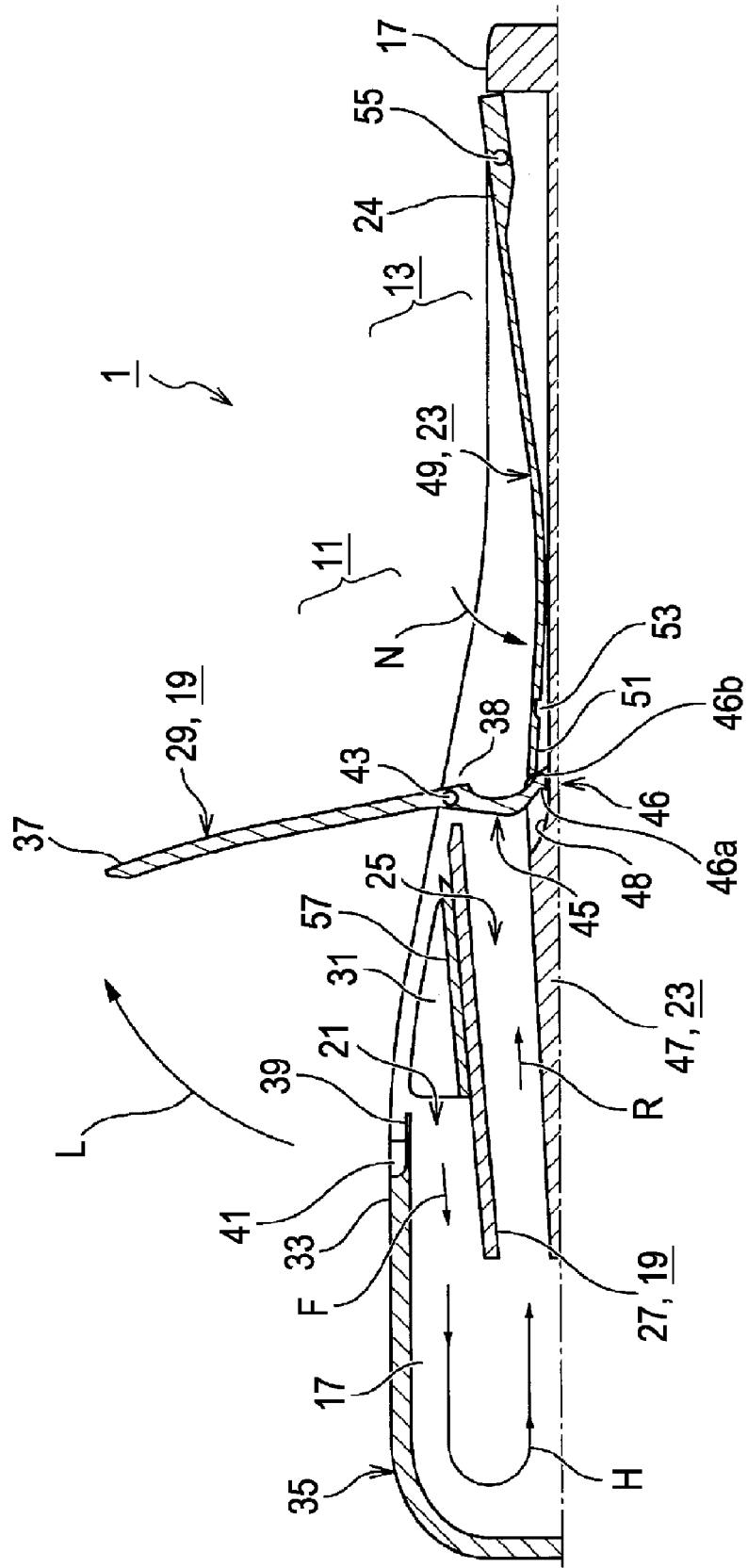
FIG. 4 is a side cross-sectional view showing the transportation device during when the first movable tray portion and the second movable tray portion are displaced from the housing position.
Figure 5:
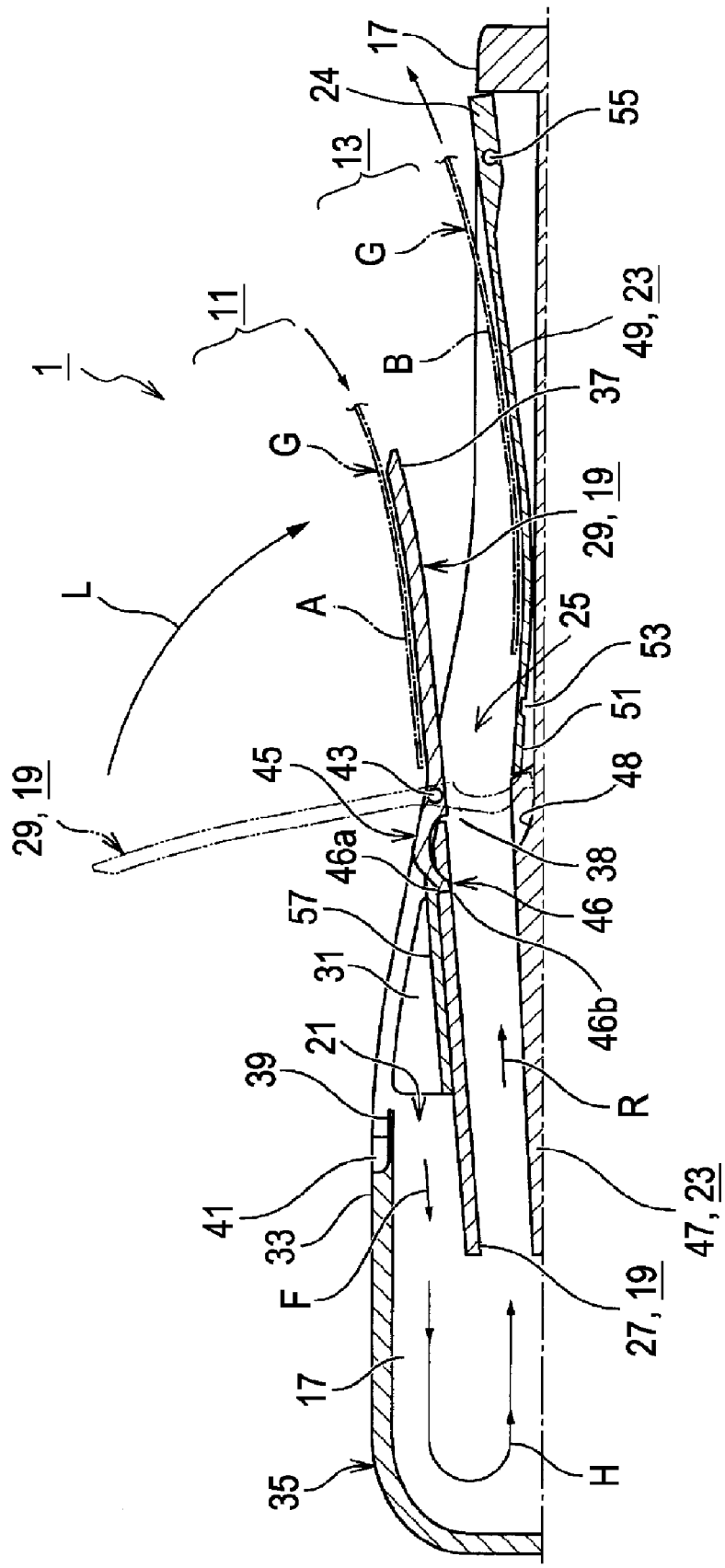
FIG. 5 is a side cross-sectional view showing the transportation device in a operational state.
Figure 6:
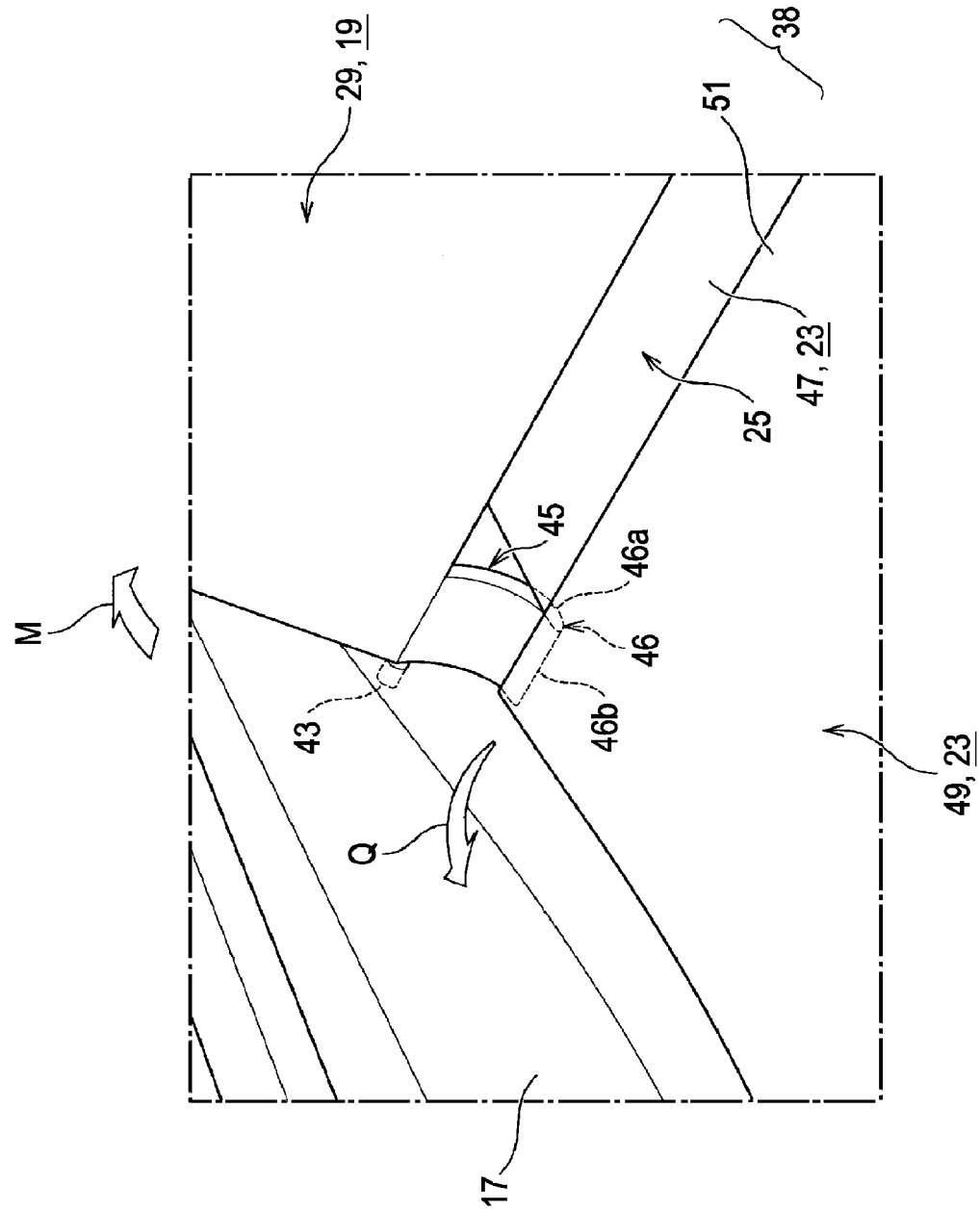
FIG. 6 is an enlarged perspective view showing the periphery of an interlocking portion when the first movable tray portion and the second movable tray portion are displaced from the housing position.
Figure 7:
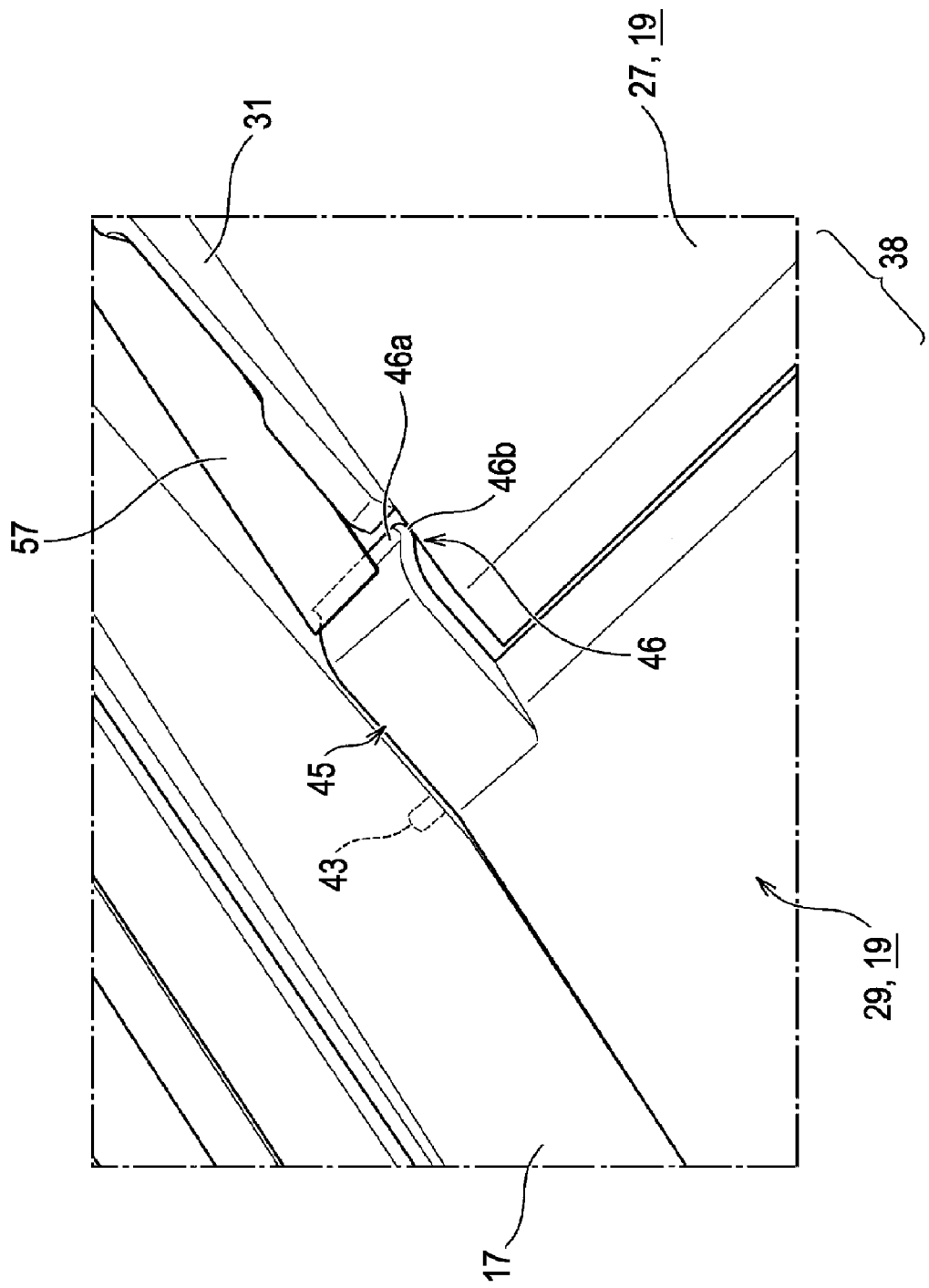
FIG. 7 is an enlarged perspective view showing the periphery of the interlocking portion during when the first movable tray portion and the second movable tray portion are in the operational state.

FIG. 1 is a perspective view showing the appearance of a multifunction printer as an example of an image processing apparatus capable of performing aspects of the invention. The printer shown in FIG. 1 is in an unused state. FIG. 2 is a perspective view showing the appearance of the multifunction printer in an operational state. FIG. 3 is a side cross-sectional view showing a transportation device in the unused state (in which a first movable tray portion and a second movable tray portion are held in a housing position). FIG. 4 is a side cross-sectional view showing the transportation device during when the first movable tray portion and the second movable tray portion are displaced from the housing position. FIG. 5 is a side cross-sectional view showing the transportation device in a operational state. FIG. 6 is an enlarged perspective view showing the periphery of an interlocking portion when the first movable tray portion and the second movable tray portion are displaced from the housing position. FIG. 7 is an enlarged perspective view showing the periphery of the interlocking portion when the first movable tray portion and the second movable tray portion are in the usable state.

First, the general configuration of the multifunction printer which includes an ink jet printer and scanner will be briefly described.

The multifunction printer 300 functions as an image reading device for reading image information C recorded on an image reading surface A of an original G by converting the image information into electronic data. The printer 300 also functions as an image recording device capable of recording an image E on a surface D of a material P (hereinafter, referred to as a sheet of paper) based on converted electronic data or electronic data which is separately provided to the printer 300. The image recording device is an ink jet printer 100 and the image reading device is a scanner 200. The multifunction printer 300 also performs acts as a copier by executing both the previously described image processes.

As shown in FIGS. 1 and 2, an operating panel 3, an ejection stacker 5 and a memory card insertion port 7 are arranged on the front surface of a printer main body 2 of the ink jet printer 100, and a feed cassette in which a plurality of sheets P are stacked is detachably mounted below the printer main body 2. Each of the sheets P set in the feed cassette is transported by a transportation unit (not shown) to a recording position where a recording head (not shown) is provided. An image E is recorded on the surface D of the sheet P by the recording head, and the sheet is stacked on a placement surface 6 of the ejection stacker 5.

A feed portion 11 for feeding an original Q, which is a material G to be transported through the printer, and ejection portion 13 for ejecting the material G positioned below the feed portion 11 are disposed in the scanner 200. On the left end of the feed portion 11 and the ejection portion 13 is a inversion portion 15 for connecting the feed portion 11 and the ejection portion 13. A feed tray portion 19, which comprises a first tray portion as claimed below, is provided in the feed portion 11, and a feed opening 21 comprising a first transportation opening is provided between the feed tray portion 19 and a housing 17.

An ejection tray portion 23 which comprises a second tray portion is provided in the ejection portion 13, and an ejection opening 25 which comprises a second feed opening is provided between the ejection tray portion 23 and the feed tray portion 19. A transportation path which has a return loop shape denoted by an arrow H is provided in the inversion portion between the feed opening 21 and the ejection opening 25. A photosensitive body unit (not shown) for irradiating light onto the image information C recorded on the image reading surface of material G transported in the transportation path H is also provided. The material G is set on the feed tray portion 19 with the image reading surface A facing up. Then the material G is introduced from the feed opening 21 into the housing 17, is inverted by the inversion portion 15 while the image reading process is simultaneously being performed, is then ejected from the ejection opening 25 to the housing 17, and is ejected on the ejection tray portion 23 in an inverted state with the image reading surface A facing down and its rear surface B facing up.

First Embodiment

Hereinafter, a transportation device 1 of the invention may be used by the scanner 200 of the multifunction printer 300 will be described in detail with reference to FIGS. 3 to 7.

The transportation device 1 according to the present embodiment includes the feed tray portion 19, the ejection tray portion 23, the feed opening 21, the ejection opening 25 and the transportation path H. The feed tray portion 19 includes a fixed tray portion 27 which is integrally formed with the housing 17 and a first movable tray portion 29 which can be moved separately from the housing 17. The fixed tray portion 27 has a rectangular flat plate shape and is inclined so as to gradually lower toward a transportation direction F. As shown in FIG. 2, on the front and rear edges of the fixed tray portion 27, a pair of edge guides 31 for regulating left and right side edges (edges) of the material G to be transported are provided so as to face each other As shown in FIGS. 3 to 5, an overhang portion 33 is provided above the fixed tray portion 27 in the shape of an overhanging eave toward the right side. The overhanging portion 33 is a portion of the housing comprising the inversion portion 15. A rectangular opening which is formed in the vertical direction between the overhang portion 33 and the fixed tray portion 27 becomes the feed opening 21. In the front end of the overhang portion 33 is a locking end 39 which is in contact with the lower surface of a rotatable free end 37 of the first movable tray portion 29. A concave portion 41 is also provided in the center of the locking portion 39. The concave portion 41 is designed to be held by a user's finger to open the first movable tray portion 29 of the feed tray portion 19 so that the printer 300 may be used.

When the printer 300 is in the unused state shown in FIG. 3, the first movable tray portion 29 comprises a rectangular plate which protrudes slightly upward. The free end 37 of the first movable tray portion 29 can rotate about a base end 38, which acts as a first rotation point 43, with the first rotation point 43 being provided on the upstream end of the fixed tray portion in the transportation direction. The free end 37 can rotate on the first rotation point 43 with respect to the housing 17 in a range of, for example, about 170°.

That is, the free end 37 of the first movable tray portion 27 can be moved between a tray position and a housing position. In the tray position, the fixed tray portion 27 and the first movable tray portion 29 are flush with each other so as to form the upper surface of the feed tray portion 19.

A scooping-up hook 45 is proved on the base end 38, is the scooping-up hook being an example of an interlocking portion, the hook 45 extending to a side opposite to the free end 37 with the first rotation point 43 interposed therebetween. When the first movable tray portion 29 is shifted from the operational state shown in FIG. 5 to the unused state shown in FIG. 3 via displacement shown in FIG. 4, the scooping-up hook 45 causes the free end 51 of the second movable tray portion 49 of the ejection tray portion 23 to move upward. In the operational state shown in FIG. 5, the scooping-up hook 45 is brought into contact with the lower surface of stoppers 57 which are provided outside the edge guides 31 and serve to set the inclination angle of the second movable tray portion 29.

The ejection tray portion 23 includes a fixed tray portion 47 which is integrally formed with the housing 17 and a second movable tray portion 49 which can be moved separately from the housing 17. The upper surface of the fixed tray portion 47 is a transportation surface and is inclined so as to become gradually higher toward the transportation direction R. An escaping portion 48 which is formed in an arc shape such that the scooping-up hook 45 of the second movable tray portion 29 can smoothly rotate is formed in the end of the downstream side of the fixed tray portion 47 in the transportation direction. The fixed tray portion 27 of the feed tray portion 19 is positioned above the fixed tray portion 47 such that the rectangular opening partitioned by the upper and lower fixed tray portions 27 and 47 forms the ejection opening 25.

As shown in FIGS. 3 to 5, the second movable tray portion 49 is a rectangular plate which protrudes slightly downward. In the second movable tray portion 49, a free end 51 can rotate on a base end 24 as a second rotation point 55, with the second rotation point 55 is provided in the vicinity of the right end of the housing 17. The free end 51 can rotate on the base end 24 as the rotation point 55 with respect to the housing 17, in a range of, for example, about 10°.

That is, the second movable tray portion 49 rotates between the position of one side (lower side) of the ejection opening 25 where the ejection opening 25 is opened and the position of the other side (upper side) of the ejection opening 25 where the ejection opening 25 is closed so that the free end 51 faces the ejection opening 25 so that the surface used in the tray attitude and the surface used in the housing attitude form a single surface. The fixed tray portion 47 and the second movable tray portion 49 are connected in flush with each other in the tray position so as to form the upper surface of the ejection tray portion 23.

A locking concave portion 53 for receiving a hook 46 of the front end of the scooping-up hook 45 is provided in the lower surface of the free end 51 of the base end 38 of the second movable tray portion 29.

In the transportation device 1 of the present embodiment, a feed tray portion 19 and the ejection tray portion 23 is provided when the first movable tray portion 29 of the feed tray portion 19 rotates in an enlarging direction L and the second movable tray portion 49 of the ejection tray portion 23 rotates in an enlarging direction N, so that the printer 300 can be placed in an operational state. In contrast, by rotating the first movable tray portion 29 of the feed tray portion 19 in a closing direction M and rotating the second movable tray portion 49 of the ejection tray portion 23 in a closing direction Q, the feed opening 21 and the ejection opening 25 may be closed so as to place the printer 300 in an unused state.

When the printer is in the unused state, the first movable tray portion 29 and the second movable tray portion 49 are in the housing position, so that the outer surfaces thereof are adjacent and flush with each other. Accordingly, a unified appearance design can be realized with respect to the outer surfaces of the both tray portions.

In the present embodiment, in the state shown in FIG. 3, in which the first movable tray portion 29 of the feed tray portion 19 and the second movable tray portion 49 of the ejection tray portion 23 are in the unused state, the outer surfaces of the first movable tray portion 29 and the second movable tray portion 49 are in flush with the housing 17 so as to form a smooth curved shape.

Next, (1) the transformation from the unused state to the operational state and (2) the shift from the operational state to the unused state will be described with respect to the transportation device 1 described above.

(1) Transformation to the Usable State (see FIGS. 3 to 5)

The feed tray portion 19 and the ejection tray portion 23 in the unused state shown in FIG. 3 are moved to the operational state shown in FIG. 5. In this case, a user inserts his or her finger into the concave portion 41 formed in the central portion of the overhang portion 33, causing the free end 37 of the first movable tray portion 29 to move upward so as to rotate in the enlarging direction L. Since the scooping-up hook 45 provided in the base end 38 of the first movable tray portion 29 moves downward by the rotation of the first movable tray portion 29, the second movable tray portion 49 of the ejection tray portion 23 rotates in the enlarging direction N (opposite direction of the enlarging direction L of the first movable tray portion 29).

When the rotation state shown in FIG. 4 is reached, the scooping-up hook 45 of the second movable tray portion 29 is introduced into the escaping portion 48 formed in the front end of the fixed tray portion 47 of the ejection tray portion 23 and the rotation is continues without being interfered with the fixed tray portion 47. Meanwhile, the rotation of the second movable tray portion 49 of the ejection tray portion 23 is stopped because the free end 51 is brought into contact with the front end of the fixed tray portion 47.

In addition, as shown in FIG. 5, when the first movable tray portion 29 of the feed tray portion 19 rotates in the enlarging direction L, only the second movable tray portion 29 rotates and the rotation of the first movable tray portion 29 is stopped when the base surface 46a of the hook 46 of the scooping-up hook 45 comes into contact with the lower surface of the stopper 57. Then, both the feed opening 21 and the ejection opening 25 are enlarged and the fixed tray portions 27 and 47 and the first movable tray portion 29 and the second movable tray portion 49 of the feed tray portion 19 and the ejection tray portion 23 are adjacent to each other, and the printer 300 is placed in the operational state so that the material G can be transported into the printer 300.

(2) Transformation to the Unused State (see FIGS. 3 to 5)

Then, the feed tray portion 19 and the ejection tray portion 23 in the usable state shown in FIG. 5 are moved to the unused state shown in FIG. 3. In this case, the first movable tray portion 29 rotates in the closing direction M by the free end 37 of the first movable tray portion 29 moving in the closing direction M. When the rotation state shown in FIG. 4 is reached, the scooping-up hook 45 of the first movable tray portion 29 is brought into contact with the free end 51 of the first movable tray portion 49 of the ejection tray portion 23.

In addition, when the first movable tray portion 29 rotates in the closing direction M, the free end 51 of the second movable tray portion 49 is scooped up by the scooping-up hook 45 so as to move upward and the second movable tray portion 49 rotates in the closing direction Q which is opposite to the closing direction M of the first movable tray portion 29. When the lower surface of the free end 37 of the first movable tray portion 29 is brought into contact with the locking end 39 formed in the front end of the overhang portion 33, the rotation of the first movable tray portion 29 is stopped.

In this state, the front end 46b of the hook 46 of the scooping-up hook 45 is introduced into the locking concave portion 53 formed in the lower surface of the free end 51 of the second movable tray portion 49 and the second movable tray portion 49 is supported from the lower side by the first movable tray portion 29. In the unused state shown in FIG. 3, the feed opening 21 is closed by the first movable tray portion 29 and the ejection opening 25 is closed by the second movable tray portion 49 and the first movable tray portion 29 and the second movable tray portion 49 form a housing configuring member such that a smooth curved appearance is formed on the outer surface of the housing, as shown in FIG. 1.

Other Embodiment

The transportation device 1 and the image processing apparatus including the transportation device 1 described above may be changed or omitted without departing from the scope of the invention.

For example, the first tray portion which is the member of the transportation device 1 is not limited to the feed tray portion 19 of the above-described embodiment and the ejection tray portion 23 may be used. Similarly, the second tray portion is not limited to the ejection tray portion 23 and the feed tray portion 19 may be used. The number of trays is not limited to two and at least three trays may be used. For example, a plurality of ejection tray portions 23 may be provided such that the materials to be transported are separately ejected according to the types of the materials being transported. The interlocking portion is not limited to the scooping-up hook and other known interlocking mechanisms may be applied. Further, displacement may be realized without the interlocking mechanism.

Figure 8:
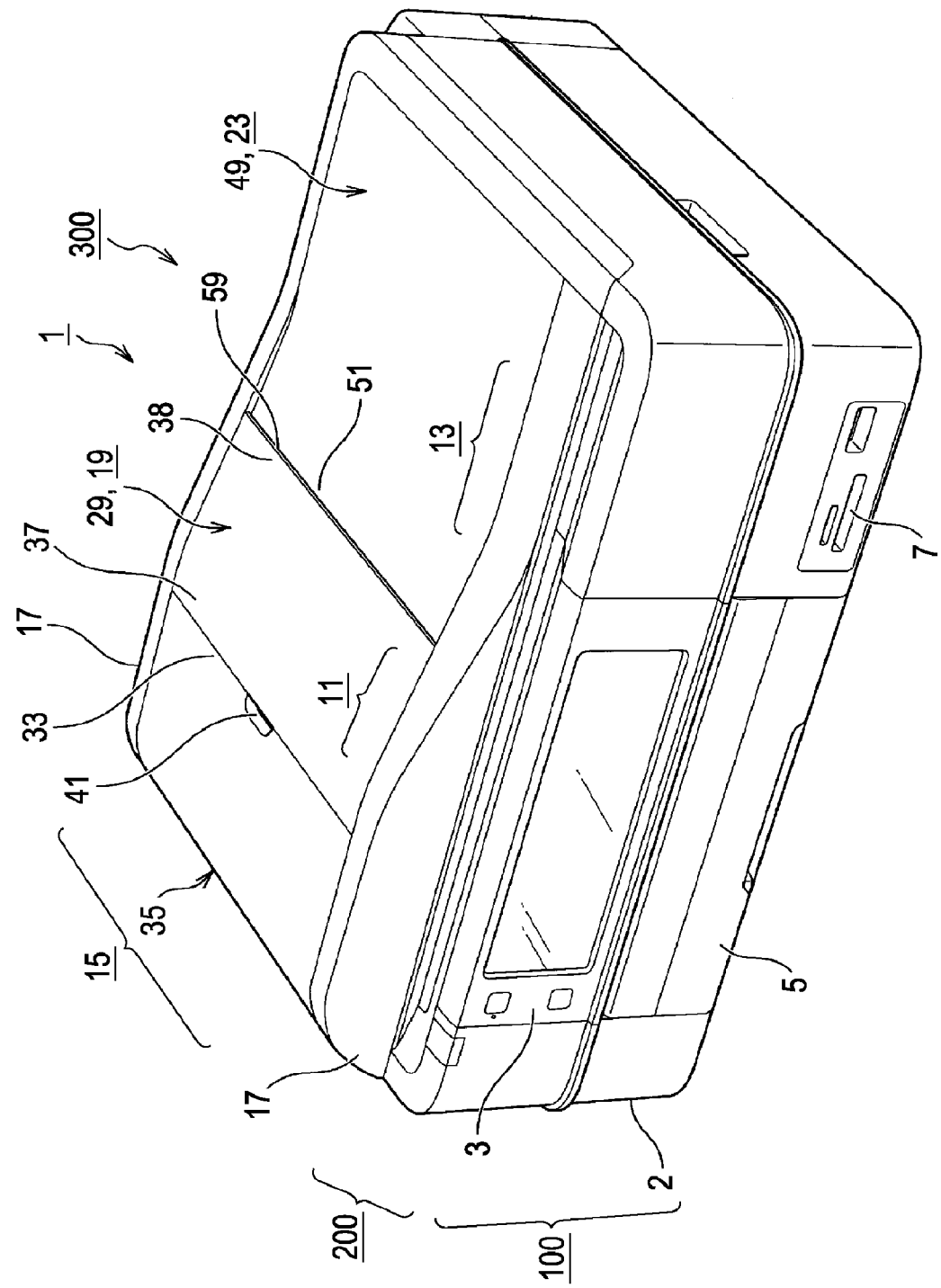
FIG. 8 is a perspective view showing the appearance of a multifunction printer in the unused state according to another embodiment of the invention.

As shown in FIG. 8, when the first movable tray portion 29 and the second movable tray portion 49 are in the housing position of the unused state, but the outer surfaces thereof may not be in flush with each other and a slight step difference 59 may be formed. The shape of the movable tray portions 29 and 49 of the first tray portion and the second tray portion is not limited to the curved plate shape and various shapes, such as a flat plate shape, may be employed. Further, a dampening device may be provided for preventing careless rotation of the movable tray portions 29 and 49 during rotation or a locking device may be provided for locking the positions of the movable tray portions 29 and 49. Finally, the transportation device 1 of the invention is not limited to the multifunction printer 300 and the invention may be applied in a variety of devices, including a scanner 200, facsimile machine, copier, or any number of other devices known in the art.

What is claimed is:

1. A transportation device comprising:
    a first plate portion axially supported relative to a housing;
    a second plate portion axially supported relative to the housing; and
    an interlocking mechanism which convert the first and second plate portions to the second position as a first plate portion in the first position rotates and release the free end of a second plate portion from a first plate portion,
    wherein the first and second plate portions are configured to transform between:
        a first position where the first and second plate portions form the housing of the transportation device with a free end of the second plate portion being placed on the first plate portion, and
        a second position where the first plate portion forms a first transportation opening for a material to be transported and the second plate portion forms a second transportation opening, and
    wherein the first and second plate portions transform to the second position when the first plate portion in the first position rotates and the free end of the second plate portion is released from the first plate portion.

2. The transportation device according to claim 1, further comprising:
    a transportation path for the material formed between the first and second transportation openings, and
    an escaping portion disposed at a position interfering with the transportation path to avoid the first plate portion from interfering when converting between the first and second positions.

3. The transportation device according to claim 1, wherein the escaping portion comprises a concave portion.

4. The transportation device according to claim 3, wherein:
    the first movable tray portion rotates such that the free end thereof is inverted so that one surface of the free end forms a surface of the tray member and the opposite surface of the free end forms a surface of the housing configuring member, and the second movable tray portion rotates between a position of one side of the second transportation opening where the second transportation opening is opened and a position of the other side of the second transportation opening where the second transportation opening is closed, such that the free end covers the second transportation opening, wherein the same the surface of the second movable tray portion forms a surface of the tray member and a surface of the housing configuring member.

5. The transportation device according to claim 1, wherein:

the interlocking mechanism includes an interlocking portion in the base end of the first movable tray portion, and the interlocking portion moves the free end of the second movable tray in a closing direction when the first movable tray portion is rotated and holds the second movable tray portion in the housing position.

6. An image processing apparatus comprising:

a transportation device including first and second tray portions which are stacked relative to each other, a first transportation opening included in the first tray portion, a second transportation opening included in the second tray portion, and a transportation path for a material to be transported through the transportation device, the transportation path being formed between the first transportation opening and the second transportation opening; and an image process executing unit which is provided in the transportation path which is capable of executing an image process with respect to the material, wherein the transportation device is the transportation device according to claim 1.

7. An image processing apparatus comprising:

a first plate portion axially supported relative to a housing;

a second plate portion axially supported relative to the housing transportation opening included in the second tray portion; and an interlocking mechanism which convert the first and second plate portions to the second position as a first plate portion in the first position rotates and release the free end of a second plate portion from a first plate portion, wherein the first and second plate portions are configured to transform between:

a first position where the first and second plate portions form the housing of the transportation device with a free end of the second plate portion being placed on the first plate portion, and a second position where the first plate portion forms a first transportation opening for a material to be transported and the second plate portion forms a second transportation opening, wherein the first and second plate portions transform to the second position when the first plate portion in the first position rotates and the free end of the second plate portion is released from the first plate portion.

8. The image processing apparatus according to claim 7, further comprising:

a transportation path for the material formed between the first and second transportation openings, and an escaping portion disposed at a position interfering with the transportation path to avoid the first plate portion from interfering when converting between the first and second positions.

9. The image processing apparatus according to claim 7, wherein the escaping portion comprises a concave portion.

10. The image processing apparatus according to claim 9, wherein:

the first movable tray portion rotates such that the free end thereof is inverted so that one surface of the free end forms a surface of the tray member and the opposite surface of the free end forms a surface of the housing configuring member, and the second movable tray portion rotates between a position of one side of the second transportation opening where the second transportation opening is opened and a position of the other side of the second transportation opening where the second transportation opening is closed, such that the free end covers the second transportation opening, wherein the same the surface of the second movable tray portion forms a surface of the tray member and a surface of the housing configuring member.

11. The image processing apparatus according to claim 7, wherein:

the interlocking mechanism includes an interlocking portion in the base end of the first movable tray portion, and the interlocking portion moves the free end of the second movable tray in a closing direction when the first movable tray portion is rotated and holds the second movable tray portion in the housing position.

* * * * *